United States Patent
Wong et al.

(10) Patent No.: US 10,427,494 B2
(45) Date of Patent: Oct. 1, 2019

(54) METHOD OF CONTROL OF HVAC SYSTEM AT VEHICLE STARTUP

(71) Applicant: FORD GLOBAL TECHNOLOGIES, LLC, Dearborn, MI (US)

(72) Inventors: David Alan Wong, Troy, MI (US); Debasish Dhar, Canton, MI (US); Alan Gutowski, Dearborn Heights, MI (US); Alan Douglas Wallington, Livonia, MI (US); Manfred Koberstein, Troy, MI (US); Mark G. Smith, Canton, MI (US); Angel Fernando Porras, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 85 days.

(21) Appl. No.: 15/585,301

(22) Filed: May 3, 2017

(65) Prior Publication Data
US 2018/0319249 A1 Nov. 8, 2018

(51) Int. Cl.
*B60H 1/00* (2006.01)

(52) U.S. Cl.
CPC ..... *B60H 1/00778* (2013.01); *B60H 1/00885* (2013.01); *B60H 1/00978* (2013.01)

(58) Field of Classification Search
CPC ............ B60H 1/00778; B60H 1/00978; B60H 1/00885
USPC .......................................................... 62/186
See application file for complete search history.

(56) References Cited

U.S. PATENT DOCUMENTS

| | | | | | |
|---|---|---|---|---|---|
| 3,668,497 | A | * | 6/1972 | Freiberger | B60H 1/00828 318/471 |
| 4,408,713 | A | * | 10/1983 | Iijima | B60H 1/00828 165/202 |
| 4,434,932 | A | * | 3/1984 | Hara | B60H 1/00842 165/43 |

(Continued)

FOREIGN PATENT DOCUMENTS

| | | |
|---|---|---|
| JP | 0585153 A | 4/1993 |
| JP | 06247136 A | 9/1994 |

OTHER PUBLICATIONS

English Machine Translation of JPH06247136A.
English Machine Translation of JPH0585153A.

*Primary Examiner* — Henry T Crenshaw
(74) *Attorney, Agent, or Firm* — Vichit Chea; King & Schickli PLLC (57) ABSTRACT

A method for controlling a vehicle climate control system includes steps of determining that a first predetermined set of conditions are satisfied whereby a heating, ventilation, and air-conditioning (HVAC) system airflow into a passenger cabin will exceed a predetermined HVAC airflow temperature threshold and, if so, automatically implementing a first climate control system operating condition at least reducing the HVAC airflow into the passenger cabin. On determining that a second predetermined set of conditions are satisfied whereby the HVAC airflow into the passenger cabin will satisfy the predetermined HVAC airflow temperature threshold, the method includes a step of automatically implementing a second climate control system operating condition increasing the HVAC airflow into the passenger cabin. Climate control systems for implementing the described methods are provided.

16 Claims, 4 Drawing Sheets

(56) References Cited

U.S. PATENT DOCUMENTS

| | | | | |
|---|---|---|---|---|
| 4,538,760 A | * | 9/1985 | Kobayashi | B60H 1/00828 236/13 |
| 4,602,675 A | * | 7/1986 | Kobayashi | B60H 1/00828 165/204 |
| 4,738,396 A | * | 4/1988 | Doi | B60H 1/00828 165/202 |
| 4,858,677 A | * | 8/1989 | Doi | B60H 1/00828 165/202 |
| 4,860,552 A | * | 8/1989 | Beckey | F24D 19/1087 62/158 |
| 5,027,611 A | * | 7/1991 | Doi | B60H 1/0075 165/202 |
| 5,423,188 A | * | 6/1995 | Neeley | G05D 23/24 62/126 |
| 5,803,166 A | * | 9/1998 | Ito | B60H 1/00057 165/203 |
| 6,173,902 B1 | * | 1/2001 | Bauer | B60H 1/00735 236/49.3 |
| 7,191,607 B2 | * | 3/2007 | Curtis | B60H 1/00785 62/186 |
| 7,340,910 B2 | * | 3/2008 | Thompson | F25B 30/02 236/44 A |
| 7,589,487 B2 | * | 9/2009 | Moller | H02P 5/68 318/112 |
| 2002/0185546 A1 | * | 12/2002 | Homan | B60H 1/00735 237/2 A |
| 2011/0271698 A1 | * | 11/2011 | Errington | B60H 1/3211 62/227 |
| 2014/0190678 A1 | * | 7/2014 | Dage | B60H 1/00828 165/202 |

\* cited by examiner

METHOD OF CONTROL OF HVAC SYSTEM AT VEHICLE STARTUP

TECHNICAL FIELD

This disclosure relates generally to vehicle heating, ventilation, and air-conditioning (HVAC) systems. In particular, the disclosure relates to methods of reducing hot air discharge into a vehicle passenger cabin at vehicle/HVAC system startup.

BACKGROUND

Particularly in hot climates creating a heated interior in a vehicle passenger cabin, a vehicle HVAC system may be unable to quickly cool/condition air on request at vehicle/HVAC system startup. At a sufficiently high HVAC blower voltage (or speed), this can result in a "hair dryer" effect temporarily introducing undesirable heated air into the passenger cabin, with attendant passenger discomfort.

Specifically, particularly in hot climates and especially when a vehicle has not been operated for some time, on vehicle startup a certain time period must pass before the engine and air conditioning (AC) compressor are at a smoothly running condition and can engage elements of the HVAC system. In turn, while the vehicle has sat idle, air contained within the HVAC duct system may be heated by the sun. As the HVAC blower engages to move air into the passenger cabin, this heated air further contributes to passenger discomfort. All these factors result in a perceived "slow to respond" condition for the vehicle AC system.

To solve this and other problems, the present disclosure is directed to a climate control system for a vehicle and associated methods for controlling the climate control system, which reduce the introduction of heated air into a vehicle passenger cabin on vehicle/HVAC system startup.

SUMMARY

In accordance with the purposes and benefits described herein, in one aspect of the present disclosure a method for controlling a vehicle climate control system is provided comprising prior to or at startup of the climate control system, determining that a first predetermined set of conditions are satisfied whereby an air-conditioning system (AC) airflow into a passenger cabin will exceed a predetermined AC airflow temperature threshold. If the first predetermined set of conditions are satisfied, next is a step of automatically implementing a first climate control system operating condition at least reducing the AC airflow into the passenger cabin.

In embodiments, the determining that a first predetermined set of conditions are satisfied includes one or more of determining that an AC system operating request has been made and determining that a vehicle heating, ventilation, and air conditioning (HVAC) evaporator core temperature equals or exceeds a predetermined threshold HVAC evaporator core temperature value. In other embodiments, further conditions may include one or more of determining that the vehicle has not been operated for at least a threshold time period, determining that a vehicle-exterior ambient temperature equals or exceeds a predetermined threshold ambient temperature value, determining that a requested HVAC blower speed setting is greater than a predetermined threshold HVAC blower speed setting value, determining that an HVAC duct discharge air temperature equals or exceeds a predetermined threshold HVAC duct discharge air temperature value, and determining that an AC system controller has no error codes.

In embodiments, the automatically implementing the first climate control system operating condition includes one or more of automatically reducing the HVAC blower speed to the predetermined threshold HVAC blower speed setting value and automatically altering an HVAC airflow distribution mode.

The provided method may further include steps of determining that a second predetermined set of conditions are satisfied whereby the AC airflow temperature will satisfy the predetermined AC airflow temperature threshold and automatically implementing a second climate control system operating condition increasing the AC airflow into the passenger cabin. In embodiments, the automatically implementing the second climate control system operating condition includes one or more of automatically restoring the HVAC blower speed to the automatically determined or user-requested HVAC blower speed setting value and automatically restoring the HVAC airflow distribution mode.

In another aspect, a climate control system for a vehicle adapted for implementing the described method is provided, comprising a heating, ventilation, and air conditioning (HVAC) system, at least one heating, ventilation, and air conditioning (HVAC) evaporator core temperature sensor, and a climate control module (CCM). The CCM comprises a controller configured to, on receiving an air-conditioning (AC) system operating request, selectively and automatically implement a climate control system operating condition at least reducing an AC airflow into a vehicle passenger cabin. The controller is configured to determine from inputs provided by the at least one HVAC evaporator core temperature sensor that an HVAC evaporator core temperature equals or exceeds a predetermined threshold HVAC evaporator core temperature value.

In embodiments, the controller is further configured to determine from inputs provide by at least one HVAC duct discharge air temperature sensor that an HVAC duct discharge air temperature equals or exceeds a predetermined threshold HVAC duct discharge air temperature value. The controller may be further configured to determine from inputs provided by a timer that the vehicle has not been operated for at least a threshold time period. The controller may be further configured to determine from inputs provided by at least one vehicle-exterior ambient temperature sensor that a vehicle-exterior ambient temperature equals or exceeds a predetermined threshold ambient temperature value. The controller may be further configured to determine that a requested HVAC blower speed setting is greater than a threshold HVAC blower speed setting value. The controller may be further configured to determine that an AC system has no error codes.

On determination of one or more of the above conditions, the controller is configured to reduce the HVAC blower speed setting to the threshold HVAC blower speed setting. The controller in embodiments may be further configured to, by an HVAC air distribution door actuator, automatically alter an HVAC airflow distribution mode.

In the following description, there are shown and described embodiments of a climate control system for a vehicle and associated methods. As it should be realized, the described devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of a climate control system for a vehicle and associated methods, and together with the description serve to explain certain principles thereof. In the drawings.

Reference will now be made in detail to embodiments of a climate control system for a vehicle and methods for controlling same, examples of which are illustrated in the accompanying drawing figures. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

DETAILED DESCRIPTION

Preliminarily, the various aspects and specific devices associated with a vehicle HVAC system, climate control system, etc. as described herein are well known in the art and do not require extensive description herein. In turn, the manner of operation of these various aspects and specific devices are also well known in the art. These features are shown herein in block form for convenience and ease of illustration.

Figure 1:
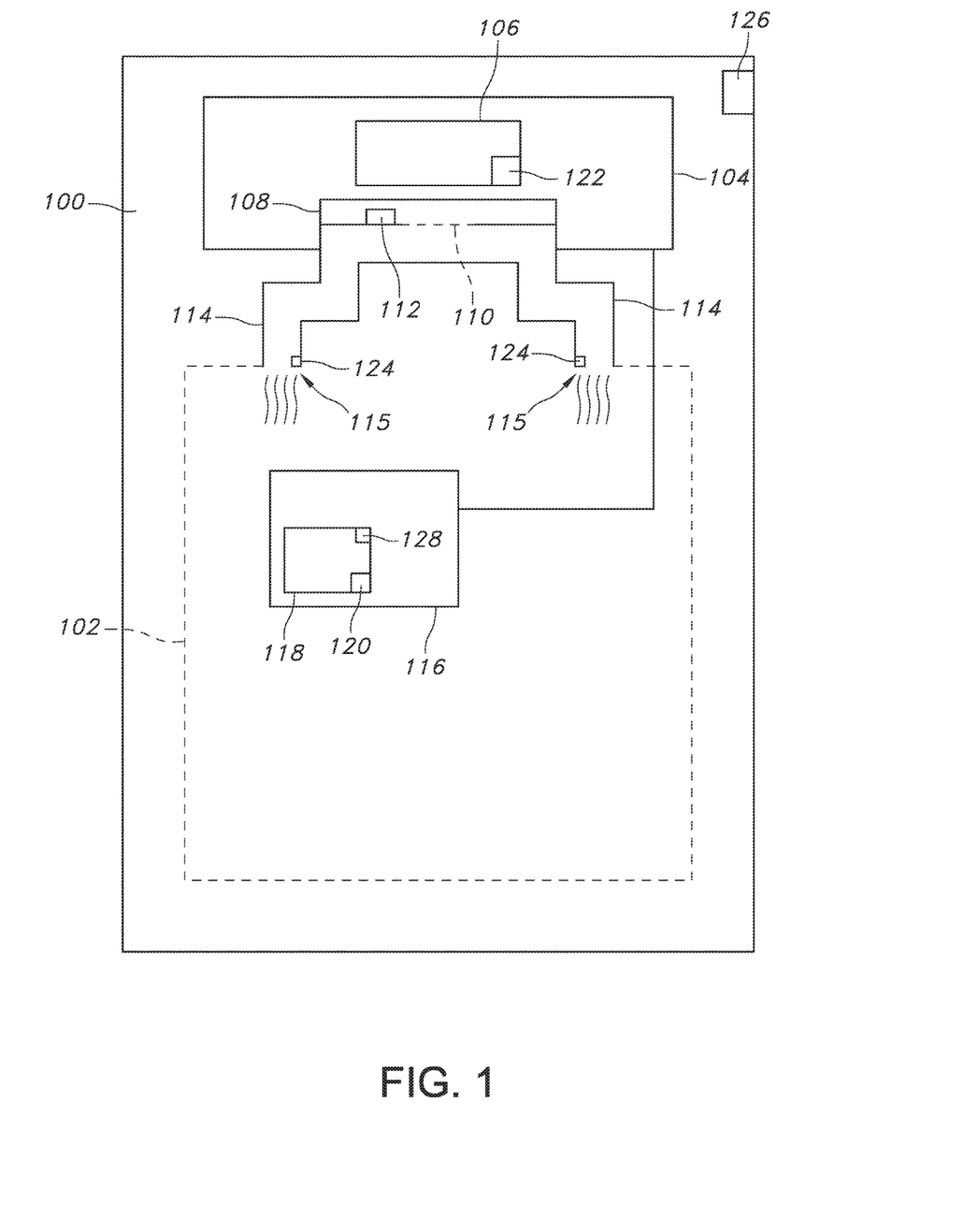
FIG. 1 shows a vehicle including an HVAC system and a climate control system according to the present disclosure.

FIG. 1 illustrates a vehicle 100 including a passenger cabin 102. The vehicle 100 includes an HVAC system 104, which in turn comprises at least an HVAC evaporator core 106. The HVAC system 104 further includes an HVAC blower 108 in fluid communication with an HVAC air distribution door 110. As is known, the HVAC air distribution door 110 may be automatically controlled by way of an actuator 112 controlling mechanical linkages (not shown) of various designs. The HVAC air distribution door 110 in turn places the HVAC blower 108 in fluid communication with an HVAC duct system 114 via which conditioned airflow is introduced into the passenger cabin 102 by way of air registers 115.

A climate control system 116 is in operative communication with the HVAC system 104. By the climate control system 116, the HVAC system 104 may automatically or by user command control an amount and a temperature of airflow introduced into the passenger cabin 102. Operative control is provided by a climate control module (CCM) 118 comprising a controller 120 provided with one or more processors, one or more memories, and storage comprising logic configured for controlling the vehicle HVAC system 104.

The climate control system 116 is further in communication with a variety of sensors, including without intending any limitation one or more of an HVAC evaporator core temperature sensor 122, one or more HVAC duct discharge air temperature sensors 124, one or more vehicle-exterior ambient temperature sensors 126, and others. The controller 120 or another vehicle controller such as the BCM (not shown) may include a timer 128 which automatically begins running on cessation of operation of the vehicle 100, the HVAC system 104, etc.

With the foregoing as background, the present disclosure provides methods for controlling the climate control system 116. At a high level, the methods comprise, prior to or at startup of the climate control system 116, determining that a predetermined set of conditions are satisfied whereby an air-conditioning system (AC) airflow into the passenger cabin 102 will exceed a predetermined AC airflow temperature threshold.

Figure 2:
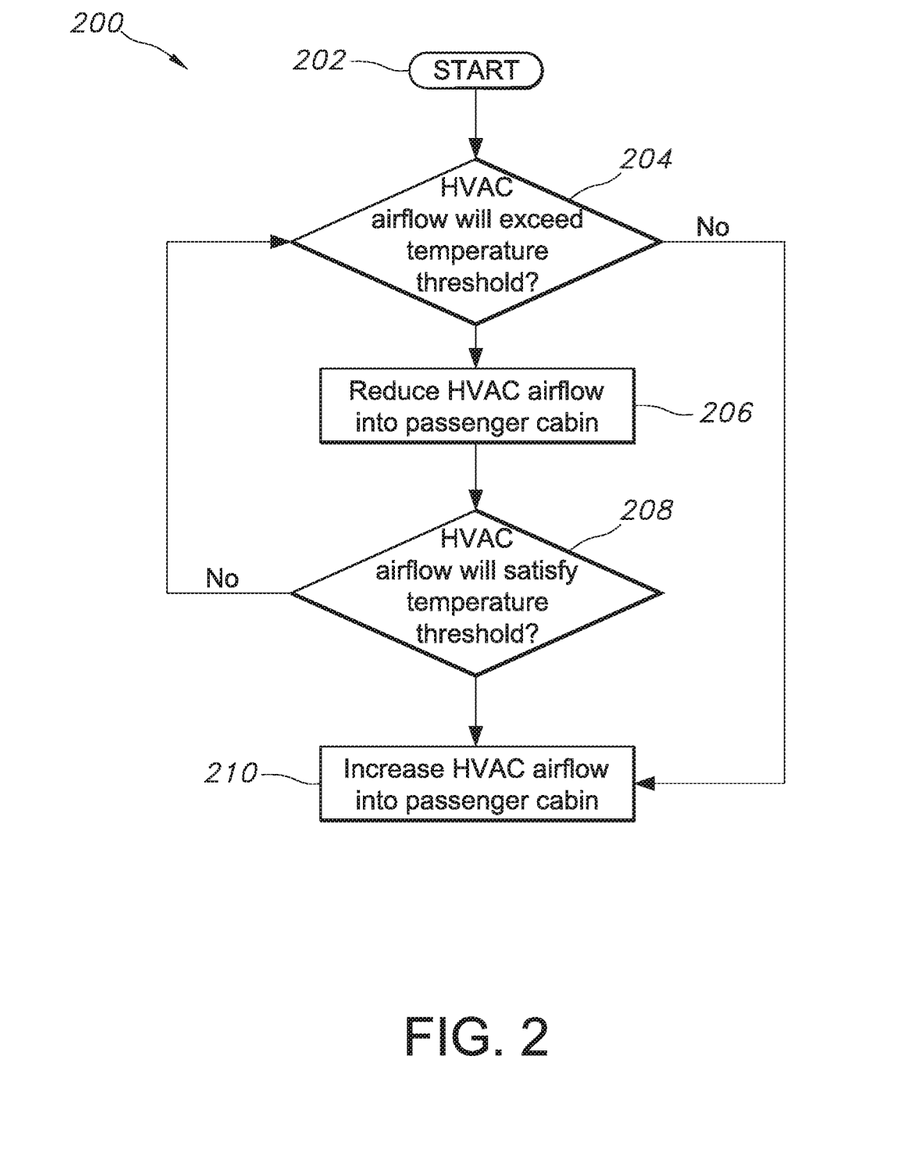
FIG. 2 shows an embodiment of a method for controlling a vehicle climate control system according to the present disclosure.

FIG. 2 illustrates at a high level a method 200 for controlling a climate control system 116 as described above. At climate control system 116 startup (step 202), by way of various inputs from one or more of at least the vehicle-exterior ambient temperature sensor 126, the HVAC evaporator core temperature sensor 122, the HVAC duct air discharge air temperature sensor 124 the controller 120 determines that a first predetermined set of conditions are satisfied whereby the HVAC airflow temperature into the passenger cabin 102 will exceed a predetermined HVAC airflow temperature threshold (step 204). If so, at step 206 the controller 120 causes implementation of a first climate control system 116 operating condition reducing HVAC airflow into the passenger cabin 102. By these steps, introduction into the passenger cabin 102 of heated air prior to the cooling thereof by the HVAC system 104 and/or heated air held in the HVAC duct system 114, along with attendant passenger (not shown) discomfort, are prevented.

Once the HVAC system 104 has been running for a sufficient period of time to clear heated air from the HVAC duct system 114 and/or to cool the AC airflow to a requested temperature, by inputs as described above the controller 120 determines that a second predetermined set of conditions are satisfied whereby the HVAC airflow temperature into the passenger cabin 102 will satisfy a predetermined HVAC airflow temperature threshold (step 208). If so, at step 210 the controller 120 causes implementation of a second climate control system 116 operating condition increasing HVAC airflow into the passenger cabin 102.

Figure 3:
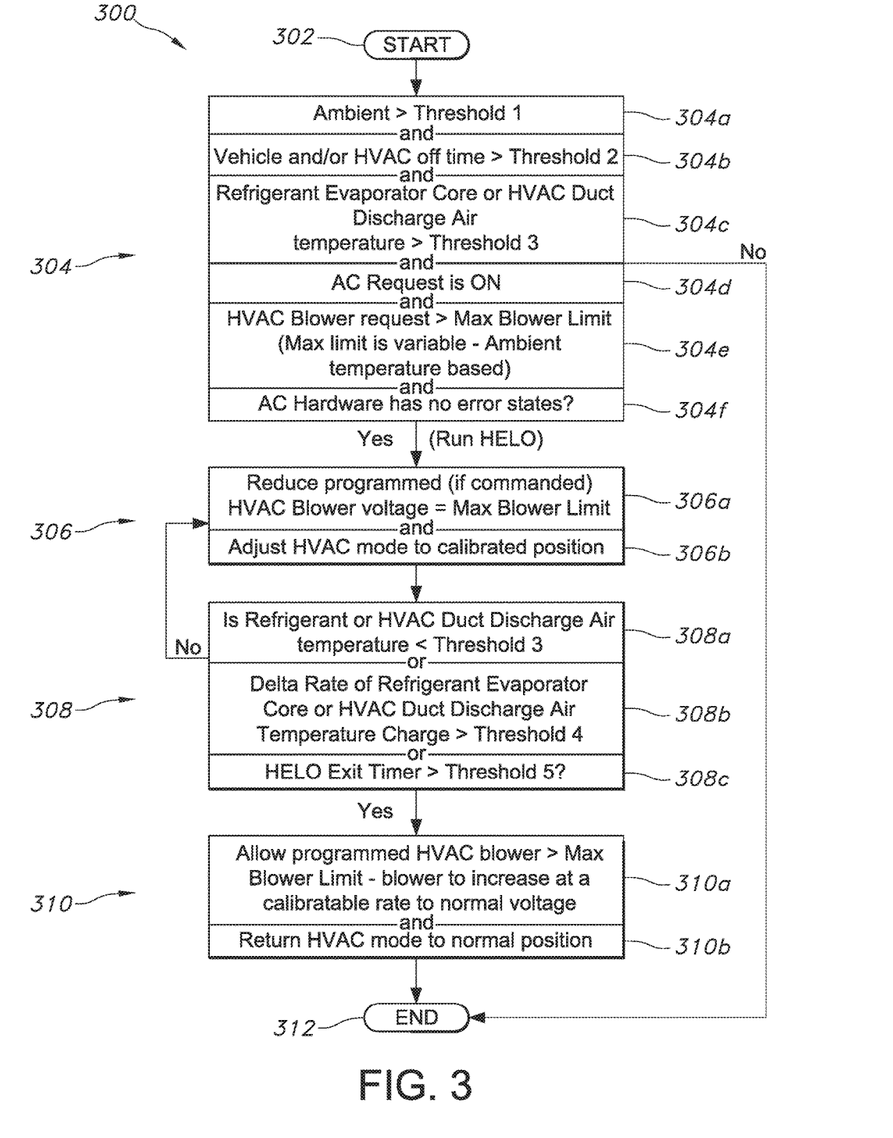
FIG. 3 shows a more detailed version of the method of FIG. 2 for controlling a vehicle climate control system.

FIG. 3 illustrates in more detail an embodiment of the method shown in FIG. 2. In the depicted embodiment, a method 300 for controlling a climate control system 116 includes at climate control system 116 startup (step 302), by way of various inputs from one or more of at least the vehicle-exterior ambient temperature sensor 126, the HVAC evaporator core temperature sensor 122, and the HVAC duct air discharge air temperature sensor 124, determining by the controller 120 that a first predetermined set of conditions are satisfied whereby the HVAC airflow temperature into the passenger cabin 102 will exceed a predetermined HVAC airflow temperature threshold (step 304). If so, at step 306 the controller 120 causes implementation of a first climate control system 116 operating condition reducing HVAC airflow into the passenger cabin 102.

Once the HVAC system 104 has been running for a sufficient period of time to clear heated air from the HVAC duct system 114 and/or to cool the HVAC airflow to a requested temperature, by inputs as described above the controller 120 determines that a second predetermined set of conditions are satisfied whereby the HVAC airflow into the passenger cabin 102 will satisfy a predetermined HVAC airflow temperature threshold (step 308). If so, at step 310 the controller 120 causes implementation of a second climate control system 116 operating condition increasing HVAC airflow into the passenger cabin 102.

A number of variables and methods are contemplated in implementing the above-described steps of determining a first predetermined set of conditions, implementing a first climate control system operating condition, determining a second predetermined set of conditions, and implementing a second climate control system operating condition. For the step of determining that a first predetermined set of conditions are satisfied whereby an HVAC airflow temperature into a passenger cabin will exceed a predetermined HVAC airflow temperature threshold, the controller 120 is provided a variety of inputs. These may include determining whether an "AC on" command has been received, either by user input or as part of an automated system (step 304d), and considerations of HVAC system 104 being unable to instantly cool an HVAC system airflow to a desired temperature resulting in heated air discharging onto passengers in the passenger cabin 102. For this latter consideration, the controller 120 may determine whether the HVAC evaporator core 106 refrigerant temperature equals or exceeds a predetermined threshold HVAC evaporator core 106 temperature value (step 304c).

This input may be provided by the HVAC evaporator core temperature sensor 122. As is known, the HVAC evaporator core temperature sensor 122 may be disposed in a number of locations, including without intending any limitation on a surface of the HVAC evaporator core 106 or at a downstream location within an airflow exiting the HVAC evaporator core. Other suitable locations include immersing the HVAC evaporator core temperature sensor 122 in refrigerant contained in the HVAC evaporator core, positioning the sensor at an inlet line downstream of an expansion device or TXV prior to entering the HVAC evaporator core, and others.

Receipt of other inputs by the controller 120 is contemplated such as, by ambient temperature sensor(s) 126, that a vehicle-exterior ambient temperature is equal to or exceeds a predetermined threshold ambient temperature value (step 304a). This is to prevent implementation of the method at ambient temperatures unlikely to result in unduly hot HVAC airflow temperatures. Likewise, another input may be determining that the vehicle 100 and/or the HVAC system 104, i.e. the compressor, have been inoperative for at least a threshold time period (step 304b), which input may be provided by the CCM timer 128 or other timer associated with a vehicle electronic control module or controller.

The method 300 (and associated systems as described above) further contemplate providing inputs representative of heated air held in the HVAC duct system 114. To accomplish this, the controller 120 may determine whether an HVAC duct 114 discharge air temperature equals or exceeds a predetermined threshold HVAC duct system 114 discharge air temperature value. This input may be provided by the HVAC duct system temperature sensor(s) 124 (step 304c). The controller 120 further may receive inputs as to whether an error condition exists in the AC system hardware or software (step 304f). The controller 120 further may receive inputs as to whether a requested (by user input or automatically as part of an HVAC system 104 mode command) HVAC blower 108 speed setting is greater than a predetermined threshold HVAC blower speed setting value (step 304e). This may be provided as a determination that a particular requested HVAC blower 108 speed setting exceeds a maximum HVAC blower limit. As is known to the skilled artisan, a maximum HVAC blower 108 limit setting is typically variable, being keyed to other factors such as one or more of a determined vehicle-exterior ambient temperature value, a passenger cabin temperature value which may be determined by a passenger cabin temperature sensor (not shown), a Climate Control Module 118 setting, and others.

On determination by the controller 120 that the first predetermined set of conditions are satisfied whereby the HVAC airflow into the passenger cabin 102 will exceed a predetermined HVAC airflow temperature threshold, according to the described method 300 a first climate control system operating condition is implemented that reduces HVAC airflow into the passenger cabin 102 (step 306). In embodiments, this is accomplished by the controller 120 by reducing an HVAC blower 108 speed setting to no more than the maximum HVAC blower limit (step 306a). This can be accomplished by reducing a programmed HVAC blower 108 voltage. An additional step of altering an HVAC system 104 mode to a first calibrated position whereby HVAC airflow distribution into the passenger cabin 102 is changed (step 306b) is contemplated. This can be accomplished by adjusting the HVAC air distribution door 110 orientation by way of actuator 112 and mechanical linkages to achieve the desired airflow pattern. For example, rather than emitting air in panel mode, the HVAC air distribution door 110 may be re-oriented whereby air is emitted in panel/floor mode, reducing the likelihood that heated air will directly contact a passenger in the passenger cabin 102. As will be appreciated, the foregoing steps result in a reduced HVAC airflow speed and distribution into passenger cabin 102, and thus a reduced distribution of heated air into the passenger cabin from a just-started HVAC system 104.

Once the HVAC system 104 is capable of providing conditioned air at a desired and requested coolness, according to method 300 there is provided a step of determining that a second predetermined set of conditions are satisfied whereby the HVAC airflow temperature exiting the HVAC duct system 114 will satisfy the predetermined HVAC airflow temperature threshold (step 308). To accomplish this (step 308a), in an embodiment the controller 120 determines whether the HVAC evaporator core 106 refrigerant temperature is less than the predetermined threshold HVAC evaporator core 106 temperature value. Additionally or alternatively, the controller 120 may determine whether the HVAC duct discharge air temperature is less than the predetermined threshold HVAC duct system 114 discharge air temperature value. Again, these inputs may be provided, respectively, by the HVAC evaporator core temperature sensor 122 and the HVAC duct system 114 temperature sensor(s) 124. Alternatively or additionally, the controller 120 may be configured to determine whether the HVAC evaporator core 106 refrigerant temperature value and/or the HVAC duct 114 discharge air temperature are cooling at a delta rate that is greater than a predetermined threshold delta rate (step 308b). In yet another embodiment, the controller 120 may be operatively connected to a dedicated exit timer such as the CCM timer 128 which sets a predetermined time period after which the first climate control system operating condition is terminated.

Once the controller 120 determines that the second predetermined set of conditions are satisfied, a second climate control system 116 operating condition is automatically implemented whereby the HVAC airflow into the passenger cabin is increased (step 310). In embodiments, this is accomplished by the controller 120 by increasing the HVAC blower 108 speed setting to the requested (user or automatic) setting, up to the maximum HVAC blower limit (step 310a).

This can be accomplished by increasing a voltage supplied to the HVAC blower 108 at a calibratable rate until a normal voltage is supplied. An additional step of altering the HVAC system 104 mode to a second calibrated position whereby HVAC airflow distribution into the passenger cabin 102 is increased (step 310b) is contemplated. Again, this can be accomplished by adjusting the HVAC air distribution door 110 orientation by way of actuator 112 and mechanical linkages to achieve the desired airflow pattern. As will be appreciated, the foregoing steps result in an increased HVAC airflow speed and distribution into passenger cabin 102, and thus an increased distribution of cooled/conditioned air into the passenger cabin from the HVAC system 104.

Figure 4:
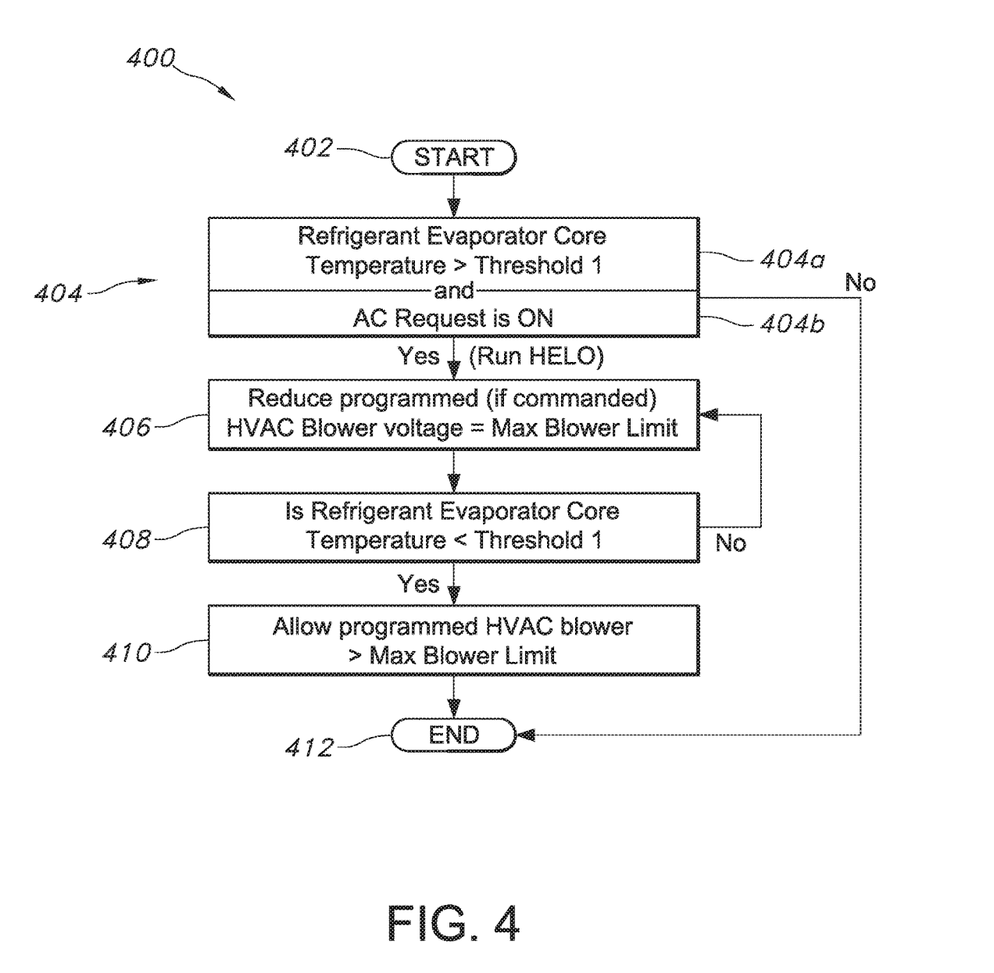
FIG. 4 shows an alternative embodiment of a method for controlling a vehicle climate control system according to the present disclosure.

FIG. 4 illustrates in more detail an alternative embodiment of a method 400 for controlling a climate control system 116 as described above. The method 400 for controlling a climate control system 116 includes at climate control system 116 startup (step 402), determining whether the HVAC evaporator core 106 temperature exceeds a predetermined HVAC airflow temperature threshold (step 404). This step includes, by the controller 120, receiving inputs from the HVAC evaporator core temperature sensor 122 (step 404a) and also determining whether an "AC on" command has been received, either by user input or as part of an automated system (step 404b). From these steps, the controller 120 determines whether a first predetermined set of conditions are satisfied whereby the HVAC airflow temperature into the passenger cabin 102 will exceed a predetermined HVAC airflow temperature threshold. If not, the process ends. If so, at step 406 the controller 120 causes implementation of a first climate control system 116 operating condition reducing HVAC airflow into the passenger cabin 102, such as by reducing a voltage supplied to the HVAC blower 108 to the maximum blower limit.

Once the HVAC system 104 has been running for a sufficient period of time to clear heated air from the HVAC duct system 114 and/or to cool the HVAC airflow to a requested temperature, the controller 120 queries the HVAC evaporator core temperature sensor 122 to determine if a second predetermined set of conditions are satisfied whereby the HVAC airflow temperature into the passenger cabin 102 will satisfy a predetermined HVAC airflow temperature threshold (step 408). This is done in the depicted embodiment by determining whether the HVAC evaporator core 106 temperature is less than the predetermined HVAC airflow temperature threshold.

If so, at step 410 the controller 120 causes implementation of a second climate control system 116 operating condition increasing HVAC airflow into the passenger cabin 102. This is done in the depicted embodiment by increasing the HVAC blower 108 speed setting to the requested (user or automatic) setting, up to the maximum HVAC blower limit (step 410). This can be accomplished by increasing a voltage supplied to the HVAC blower 108 at a calibratable rate until a normal voltage is supplied.

Obvious modifications and variations are possible in light of the above teachings. All such modifications and variations are within the scope of the appended claims when interpreted in accordance with the breadth to which they are fairly, legally and equitably entitled.

What is claimed:

1. A method for controlling a vehicle climate control system, comprising:
    prior to or at startup of the climate control system, determining satisfaction of a first predetermined set of conditions comprising determining that an air-conditioning (AC) system operating request has been made and that a vehicle heating, ventilation, and air-conditioning (HVAC) evaporator core temperature equals or exceeds a predetermined threshold HVAC evaporator core temperature value whereby an HVAC airflow into a passenger cabin will exceed a predetermined airflow temperature threshold; and
    automatically implementing a first climate control system operating condition at least reducing the HVAC airflow into the passenger cabin.

2. The method of claim 1, wherein the determining that a first predetermined set of conditions are satisfied further includes one or more of:
    determining that the vehicle has not been operated for at least a threshold time period;
    determining that a vehicle-exterior ambient temperature equals or exceeds a predetermined threshold ambient temperature value;
    determining that an automatically determined or user-requested HVAC blower speed setting value is greater than a predetermined threshold HVAC blower speed setting value;
    determining that an HVAC duct discharge air temperature equals or exceeds a predetermined threshold HVAC duct discharge air temperature value; and
    determining that a AC system controller has no error codes.

3. The method of claim 2, wherein the automatically implementing the first climate control system operating condition includes one or more of:
    automatically reducing the automatically determined or user-requested HVAC blower speed setting value to the predetermined threshold HVAC blower speed setting value; and
    automatically altering an HVAC airflow distribution mode.

4. The method of claim 3, further including:
    determining that a second predetermined set of conditions are satisfied whereby the AC airflow temperature will satisfy the predetermined HVAC airflow temperature threshold; and
    automatically implementing a second climate control system operating condition increasing the HVAC airflow into the passenger cabin.

5. The method of claim 4, wherein the automatically implementing the second climate control system operating condition includes one or more of:
    automatically restoring the HVAC blower speed to the automatically determined or user-requested HVAC blower speed setting value; and
    automatically restoring the HVAC airflow distribution mode.

6. A method for controlling a vehicle climate control system, comprising:
    Determining satisfaction of a first predetermined set of conditions comprising determining that an air conditioning (AC) system operating request has been made and that a vehicle heating, ventilation, and air conditioning (HVAC) evaporator core temperature equals or exceeds a predetermined threshold HVAC evaporator core temperature value whereby an HVAC airflow into a passenger cabin will exceed a predetermined airflow temperature threshold;
    automatically implementing a first climate control system operating condition at least reducing the HVAC airflow into the passenger cabin;
    determining that a second predetermined set of conditions are satisfied whereby the HVAC airflow into the passenger cabin will satisfy the predetermined HVAC airflow temperature threshold; and automatically implementing a second climate control system operating condition increasing the HVAC airflow into the passenger cabin.

7. The method of claim 6, wherein the determining that a first predetermined set of conditions are satisfied further comprises one or more of:

determining that the vehicle has not been operated for at least a threshold time period;

determining that a vehicle-exterior ambient temperature equals or exceeds a predetermined threshold ambient temperature value;

determining that an HVAC duct discharge air temperature equals or exceeds a predetermined threshold HVAC duct discharge air temperature value;

determining that a requested HVAC blower speed setting value is greater than a predetermined threshold HVAC blower speed setting value; and determining that an AC system controller has no error codes.

8. The method of claim 7, wherein the automatically implementing the first climate control system operating condition comprises:

automatically reducing the requested HVAC blower speed setting value to the predetermined threshold HVAC blower speed setting value; and automatically altering an HVAC airflow distribution mode.

9. The method of claim 8, wherein the automatically implementing the second climate control system operating condition comprises one or both of:

automatically restoring the HVAC blower speed to the requested HVAC blower speed setting value; and automatically restoring the HVAC airflow distribution mode.

10. A climate control system for a vehicle, comprising:

a heating, ventilation, and air conditioning (HVAC) system;

at least one heating, ventilation, and air conditioning (HVAC) evaporator core temperature sensor; and a climate control module comprising a controller configured to, on receiving an air-conditioning AC) system operating request:

determine from inputs provided by the at least one HVAC evaporator core temperature sensor that an HVAC evaporator core temperature equals or exceeds a predetermined threshold HVAC evaporator core temperature value;

determine that a requested HVAC blower speed setting value is greater than a threshold HVAC blower speed setting value; and selectively and automatically implement a climate control system operating condition whereby an HVAC blower speed setting value does not exceed the threshold HVAC blower speed setting value.

11. The climate control system of claim 10, wherein the controller is further configured to determine from inputs provide by at least one HVAC duct discharge air temperature sensor that an HVAC duct discharge air temperature equals or exceeds a predetermined threshold HVAC duct discharge air temperature value.

12. The climate control system of claim 10, wherein the controller is further configured to determine from inputs provided by a timer that the vehicle and/or an AC compressor of the vehicle has not been operated for at least a threshold time period.

13. The climate control system of claim 10, wherein the controller is further configured to determine from inputs provided by at least one vehicle-exterior ambient temperature sensor that a vehicle-exterior ambient temperature equals or exceeds a predetermined threshold ambient temperature value.

14. The climate control system of claim 10, wherein the controller is further configured to determine that an AC system has no error codes.

15. The climate control system of claim 10, wherein the controller is configured to reduce the HVAC blower speed setting to the threshold HVAC blower speed setting.

16. The climate control system of claim 10, wherein the controller is further configured to, by an HVAC air distribution door actuator, automatically alter an HVAC airflow distribution mode.

* * * * *